US011052719B2

(12) United States Patent
Hirao et al.

(10) Patent No.: US 11,052,719 B2
(45) Date of Patent: Jul. 6, 2021

(54) VEHICLE HEIGHT ADJUSTMENT DEVICE

(71) Applicant: HITACHI AUTOMOTIVE SYSTEMS, LTD., Ibaraki (JP)

(72) Inventors: Ryusuke Hirao, Kamagaya (JP); Nobuyuki Ichimaru, Yokohama (JP)

(73) Assignee: Hitachi Astemo, Ltd., Ibaraki (JP)

( * ) Notice: Subject to any disclaimer, the term of this patent is extended or adjusted under 35 U.S.C. 154(b) by 328 days.

(21) Appl. No.: 16/087,335

(22) PCT Filed: Mar. 24, 2017

(86) PCT No.: PCT/JP2017/012101
§ 371 (c)(1),
(2) Date: Sep. 21, 2018

(87) PCT Pub. No.: WO2017/170253
PCT Pub. Date: Oct. 5, 2017

(65) Prior Publication Data
US 2020/0298645 A1    Sep. 24, 2020

(30) Foreign Application Priority Data

Mar. 29, 2016  (JP) .............................. JP2016-065467

(51) Int. Cl.
*B60G 17/015*    (2006.01)
*B60G 17/018*    (2006.01)
*B60G 17/019*    (2006.01)

(52) U.S. Cl.
CPC ......... *B60G 17/018* (2013.01); *B60G 17/019* (2013.01); *B60G 2400/252* (2013.01); *B60G 2400/823* (2013.01); *B60G 2500/30* (2013.01)

(58) Field of Classification Search
CPC .. B60G 17/018; B60G 17/015; B60G 17/019; B60G 2400/823; B60G 2400/252; B60G 2500/30

(Continued)

(56) References Cited

U.S. PATENT DOCUMENTS 5,586,781 A    12/1996  Anderson
6,168,171 B1 *  1/2001  Shono .................. B60G 17/005
                                              280/5.507

(Continued)

FOREIGN PATENT DOCUMENTS

DE    197 29 274    1/1999
DE    199 59 012    9/2008

(Continued)

OTHER PUBLICATIONS

International Search Report dated Apr. 25, 2017 in International (PCT) Application No. PCT/JP2017/012101.

(Continued)

*Primary Examiner* — Toan C To
(74) *Attorney, Agent, or Firm* — Wenderoth, Lind & Ponack, L.L.P.

(57) ABSTRACT

A vehicle height adjustment device includes: vehicle height adjustment actuators provided to at least a pair of front wheels or a pair of rear wheels of a vehicle, and configured to adjust a vehicle height defined by a distance between the wheels and a vehicle body; an actuator control device configured to control the vehicle height adjustment actuators such that the vehicle height approximates to a target vehicle height; and a detection device configured to detect a physical quantity which varies as upward or downward movement of the vehicle body is restricted due to contact with an external contacted object. The actuator control device stops upward or downward movement of the vehicle body, and switches to movement in an opposite direction based on a detected value of the detection device, when the determination that the movement of the vehicle body is restricted is made by the detection device.

4 Claims, 13 Drawing Sheets

(58) Field of Classification Search
USPC ....... 280/124.157, 124.158, 124.159, 124.16
See application file for complete search history.

(56) References Cited

U.S. PATENT DOCUMENTS

| | | | | |
|---|---|---|---|---|
| 6,219,601 | B1* | 4/2001 | Shono | B60G 17/016 |
| | | | | 701/36 |
| 6,282,470 | B1* | 8/2001 | Shono | B60G 17/015 |
| | | | | 180/41 |
| 7,761,205 | B2* | 7/2010 | Onuma | B60G 17/04 |
| | | | | 701/36 |
| 2001/0003386 | A1 | 6/2001 | Stiller | |
| 2006/0142916 | A1 | 6/2006 | Onuma et al. | |
| 2009/0062985 | A1* | 3/2009 | Ohashi | B60G 17/04 |
| | | | | 701/37 |
| 2016/0272035 | A1* | 9/2016 | Oishi | B60G 17/0525 |
| 2017/0349023 | A1* | 12/2017 | Mori | B60G 17/016 |
| 2018/0194188 | A1* | 7/2018 | Kasuya | B60R 16/023 |
| 2018/0229574 | A1* | 8/2018 | Okimura | B60G 17/0528 |
| 2019/0255903 | A1* | 8/2019 | Hirao | B60G 17/018 |

FOREIGN PATENT DOCUMENTS

| | | |
|---|---|---|
| JP | 04-108023 | 4/1992 |
| JP | 08-503184 | 4/1996 |
| JP | 2006-188088 | 7/2006 |
| JP | 2007-099096 | 4/2007 |
| JP | 2008-018787 | 1/2008 |

OTHER PUBLICATIONS

Office Action dated Nov. 12, 2020 in corresponding German Patent Application No. 112017001745.9, with English translation.

\* cited by examiner

Fig. 4

| | IMPACT DETERMINATION PROHIBITION CONDITION |
|---|---|
| PROHIBITION CONDITION 1 | $H > Hfr \times 0.9$ |
| PROHIBITION CONDITION 2 | $H < Hfj \times 0.9$ |
| PROHIBITION CONDITION 3 | NO SYSTEM ABNORMALITY |
| PROHIBITION CONDITION 4 | ANY DOOR BEING OPEN |
| PROHIBITION CONDITION 5 | TRAVELING STATE |

Fig. 5

| | SNOW BANK DETERMINATION CONDITION |
|---|---|
| SB DETERMINATION CONDITION 1 (1) | STOPPED STATE, ALL DOORS BEING CLOSED, NO SYSTEM ABNORMALITY, $H > Hfr \times 0.9$ |
| SB DETERMINATION CONDITION 2 (1) | $0 > \Delta Hmax > \Delta Hsb1$ |
| SB DETERMINATION CONDITION 3 (1) | $\Delta P < \Delta Psb1$ |
| SB DETERMINATION CONDITION 4 (1) | $Ipv > Ipv0$ |
| SB DETERMINATION CONDITION 5 (1) | $Iv > Iv0$ |

Fig. 6

| | GARAGE CEILING DETERMINATION CONDITION |
|---|---|
| GC DETERMINATION CONDITION 1 (1) | STOPPED STATE, ALL DOORS BEING CLOSED, NO SYSTEM ABNORMALITY, $H < Hfj \times 0.9$ |
| GC DETERMINATION CONDITION 2 (1) | $0 < \Delta Hmin < \Delta Hgc1$ |
| GC DETERMINATION CONDITION 3 (1) | $\Delta P > \Delta Pgc1$ |
| GC DETERMINATION CONDITION 4 (1) | DRIVE COMMAND FOR COMPRESSOR BEING IN ON STATE |
| GC DETERMINATION CONDITION 5 (1) | $Ipv > Ipv0$ |

Fig. 7

| | | VEHICLE HEIGHT VARIATION RATE $\Delta H$ | PRESSURE VARIATION RATE $\Delta P$ |
|---|---|---|---|
| VEHICLE HEIGHT H | HIGH | SMALL | LARGE |
| | 0 | LARGE | SMALL |
| | LOW | SMALL | LARGE |

Fig. 8

|  |  | VEHICLE HEIGHT VARIATION RATE ΔH | VEHICLE HEIGHT VARIATION RATE ΔH |
|---|---|---|---|
| AT THE TIME OF ELEVATING | PRESSURE P: HIGH | SMALL | SMALL |
| | PRESSURE P: LOW | LARGE | LARGE |
| AT THE TIME OF LOWERING | PRESSURE P: HIGH | LARGE | LARGE |
| | PRESSURE P: LOW | SMALL | SMALL |

Fig. 9

|  |  | VEHICLE HEIGHT VARIATION RATE ΔH | PRESSURE VARIATION RATE ΔP |
|---|---|---|---|
| BATTERY VOLTAGE V | HIGH | LARGE | LARGE |
| | LOW | SMALL | SMALL |

Fig. 12
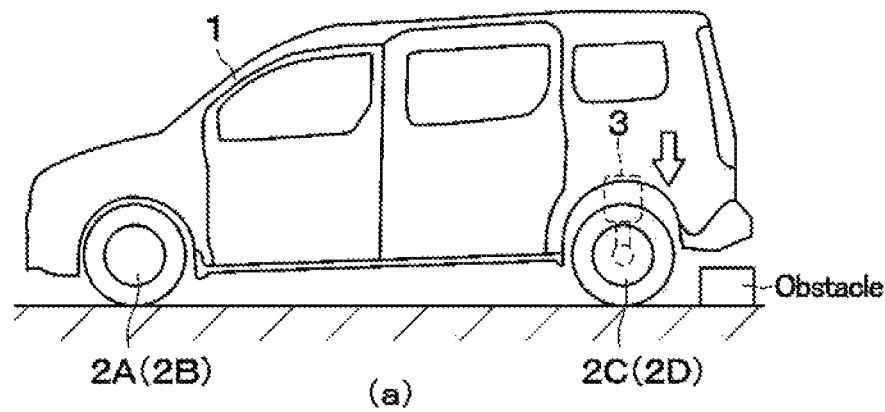
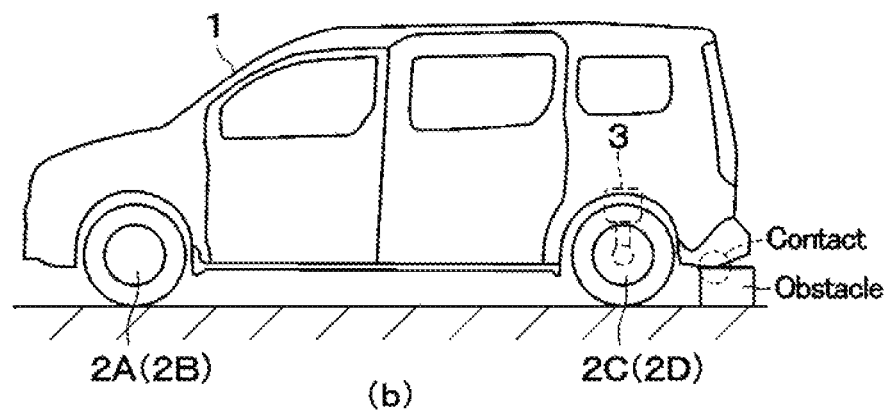
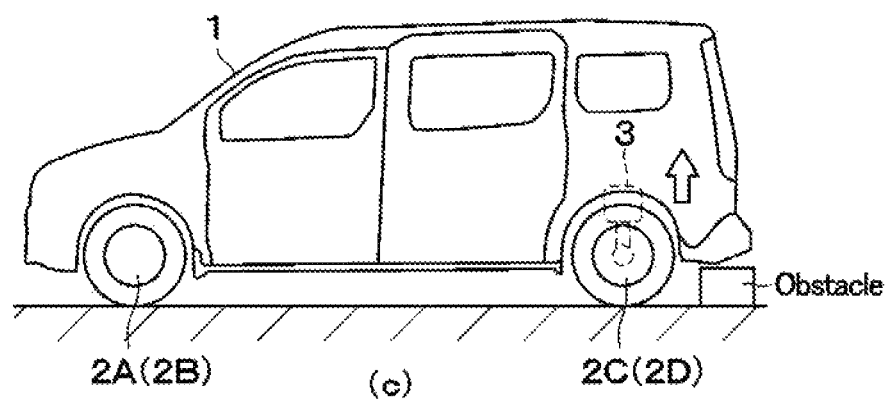

Fig. 13
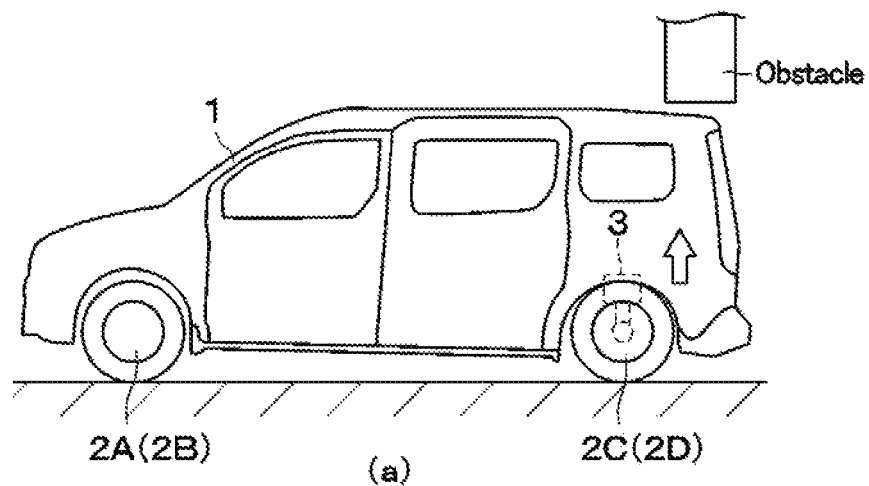
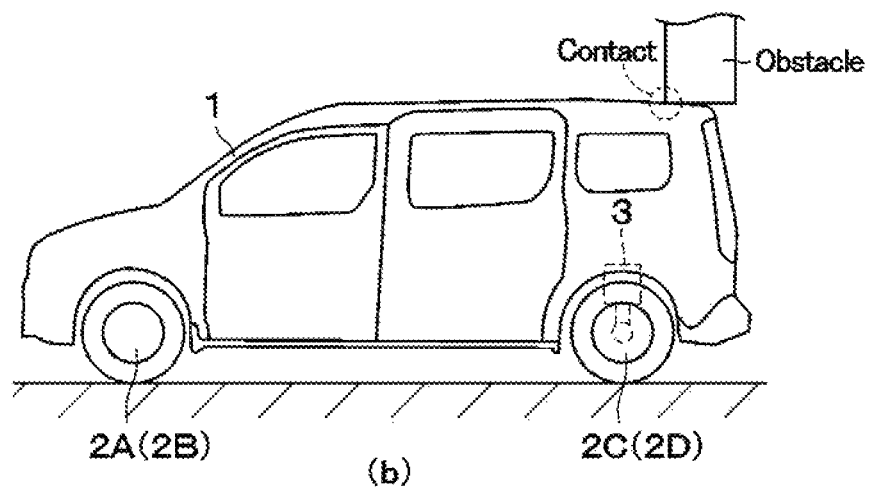
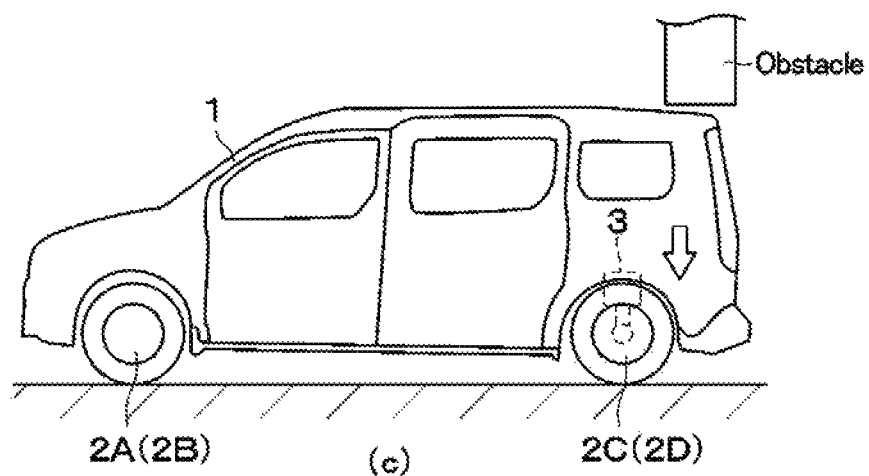

Fig. 14

| | SNOW BANK DETERMINATION CONDITION |
|---|---|
| SB DETERMINATION CONDITION 1 (2) | STOPPED STATE, ALL DOORS BEING CLOSED, NO SYSTEM ABNORMALITY, $H > Hfr \times 0.9$ |
| SB DETERMINATION CONDITION 2 (2) | $0 > \Delta Hmax > \Delta Hsb2$ |
| SB DETERMINATION CONDITION 3 (2) | $\Delta P < \Delta Psb2$ |
| SB DETERMINATION CONDITION 4 (2) | $Ipv > Ipv0$ |
| SB DETERMINATION CONDITION 5 (2) | $Iv > Iv0$ |

Fig. 15

| | GARAGE CEILING DETERMINATION CONDITION |
|---|---|
| GC DETERMINATION CONDITION 1 (2) | STOPPED STATE, ALL DOORS BEING CLOSED, NO SYSTEM ABNORMALITY, $H < Hfj \times 0.9$ |
| GC DETERMINATION CONDITION 2 (2) | $0 < \Delta Hmin < \Delta Hgc2$ |
| GC DETERMINATION CONDITION 3 (2) | $\Delta P > \Delta Pgc2$ |
| GC DETERMINATION CONDITION 4 (2) | DRIVE COMMAND FOR COMPRESSOR BEING IN ON STATE |
| GC DETERMINATION CONDITION 5 (2) | $Ipv > Ipv0$ |

Fig. 16

| | SNOW BANK DETERMINATION CONDITION |
|---|---|
| SB DETERMINATION CONDITION 1 (3) | STOPPED STATE, ALL DOORS BEING CLOSED, NO SYSTEM ABNORMALITY |
| SB DETERMINATION CONDITION 2 (3) | $H > Hfr \times 0.9$  OR  $H < Hfj \times 0.9$ |
| SB DETERMINATION CONDITION 3 (3) | $0 > \Delta Hmax$ |
| SB DETERMINATION CONDITION 4 (3) | $(\Delta P / \Delta H) > Rsb$ |
| SB DETERMINATION CONDITION 5 (3) | $Ipv > Ipv0$ |
| SB DETERMINATION CONDITION 6 (3) | $Iv > Iv0$ |

Fig. 17

| | GARAGE CEILING DETERMINATION CONDITION |
|---|---|
| GC DETERMINATION CONDITION 1 (3) | STOPPED STATE, ALL DOORS BEING CLOSED, NO SYSTEM ABNORMALITY |
| GC DETERMINATION CONDITION 2 (3) | $H > Hfr \times 0.9$ OR $H < Hfj \times 0.9$ |
| GC DETERMINATION CONDITION 3 (3) | $0 < \Delta Hmin$ |
| GC DETERMINATION CONDITION 4 (3) | $(\Delta P / \Delta H) > Rgc$ |
| GC DETERMINATION CONDITION 5 (3) | DRIVE COMMAND FOR COMPRESSOR BEING IN ON STATE |
| GC DETERMINATION CONDITION 6 (3) | $Ipv > Ipv0$ |

VEHICLE HEIGHT ADJUSTMENT DEVICE

TECHNICAL FIELD

The present invention relates to a vehicle height adjustment device preferably mounted on a vehicle such as a four-wheeled vehicle, for example.

BACKGROUND ART

PTL 1 discloses a vehicle height adjustment device which cancels a vehicle height adjustment when the presence of an object is detected within a set region of a vehicle before the vehicle height adjustment is started or during the adjustment.

CITATION LIST

Patent Literature

PTL 1: Japanese Patent Laid-Open No. 2006-188088

SUMMARY OF INVENTION

Technical Problem

In the vehicle height adjustment device described in PTL 1, a surrounding object detection device, formed of a clearance sonar, a millimeter wave radar or the like, is provided at each of four corners of a vehicle, and the presence of an object is detected using these surrounding object detection devices. Accordingly, for example, when an obstacle comes directly beneath the vehicle, the object may not be detected. When a vehicle height is decreased in such a state, the bottom of the vehicle body impacts with the object so that wheels tend to lift up. When drive wheels lift up, there is a possibility that the vehicle cannot acquire a drive force thus being prevented from staring moving.

The surrounding object detection device described in PTL 1 performs a detection of an object disposed in front of or below the vehicle, but does not perform a detection of an object disposed above the vehicle. Accordingly, for example, there is a problem that when the vehicle height is increased in a state where a vehicle enters a garage having a low ceiling, an upper portion of the vehicle body impacts with the ceiling of the garage.

It is an object of the present invention to provide a vehicle height adjustment device which can detect an impact between a vehicle body and an object with high accuracy.

Solution to Problem

A vehicle height adjustment device according to one embodiment of the present invention includes: vehicle height adjustment actuators which are provided to at least a pair of front wheels or a pair of rear wheels out of a plurality of wheels of a vehicle, and which are configured to adjust a vehicle height defined by a distance between the wheels and a vehicle body; an actuator control device configured to control the vehicle height adjustment actuators such that the vehicle height approximates to a target vehicle height; and a detection device configured to detect a physical quantity which varies as upward or downward movement of the vehicle body is restricted due to contact with an external contacted object, wherein with the determination by the detection device that the movement of the vehicle body is restricted, the actuator control device stops the upward or downward movement of the vehicle body, and switches to movement in an opposite direction based on a detected value of the detection device.

According to one embodiment of the present invention, an impact between a vehicle body and an object can be detected with high accuracy.

BRIEF DESCRIPTION OF DRAWINGS

FIG. 4 is an explanatory view showing one example of impact determination prohibition conditions.

FIG. 5 is an explanatory view showing one example of snow bank determination conditions according to the first embodiment.

FIG. 6 is an explanatory view showing one example of garage ceiling determination conditions according to the first embodiment.

FIG. 7 is an explanatory view showing one example of a relationship of a vehicle height with respect to a vehicle height variation rate and a pressure variation rate.

FIG. 8 is an explanatory view showing one example of a relationship of a pressure with respect to the vehicle height variation rate and the pressure variation rate.

FIG. 9 is an explanatory view showing one example of a relationship of a battery voltage with respect to the vehicle height variation rate and the pressure variation rate.

FIG. 12 is an explanatory view showing a state of a vehicle when snow bank occurs in the process of lowering the vehicle body.

FIG. 13 is an explanatory view showing a state of the vehicle when garage ceiling occurs in the process of elevating the vehicle body.

FIG. 14 is an explanatory view showing one example of snow bank determination conditions according to the second embodiment.

FIG. 15 is an explanatory view showing one example of garage ceiling determination conditions according to the second embodiment.

FIG. 16 is an explanatory view showing one example of snow bank determination conditions according to the third embodiment.

FIG. 17 is an explanatory view showing one example of garage ceiling determination conditions according to the third embodiment.

DESCRIPTION OF EMBODIMENTS

Hereinafter, vehicle height adjustment devices according to embodiments of the present invention are described in detail with reference to attached drawings by taking, as an example, a case where the vehicle height adjustment device is mounted on a vehicle such as a four-wheeled vehicle.

Figure 1:
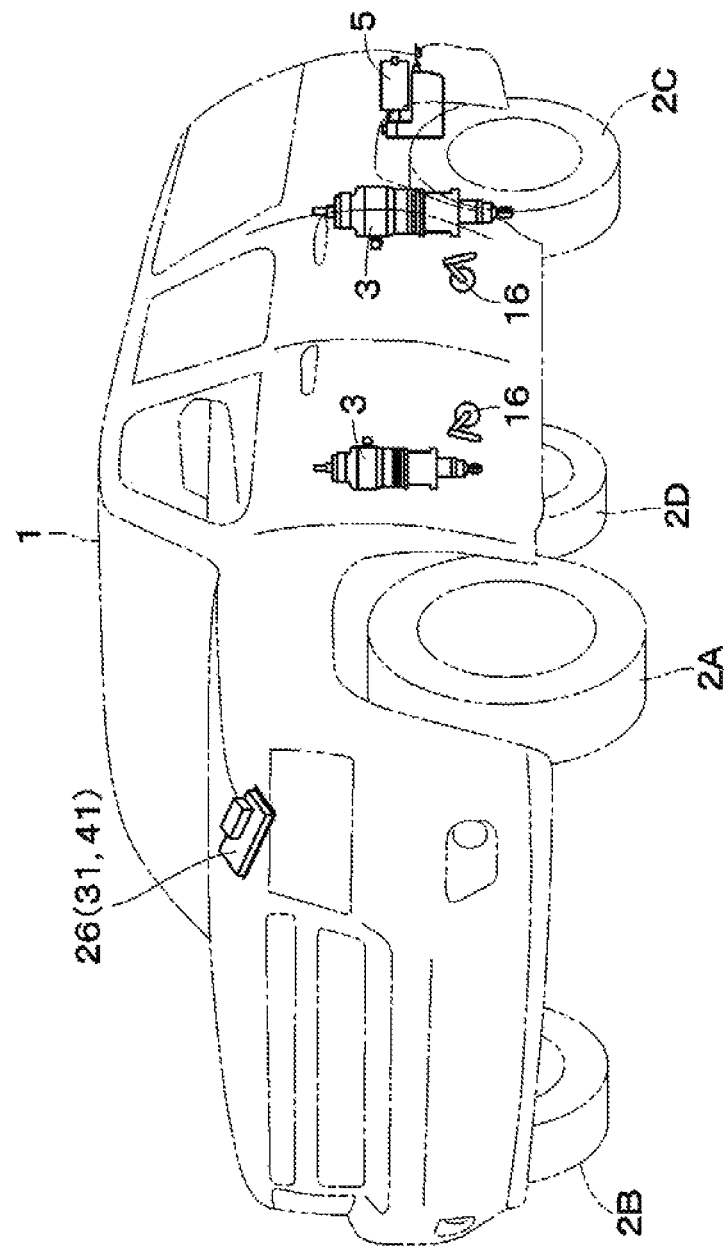
FIG. 1 is a conceptual view showing a vehicle on which a vehicle height adjustment device according to a first, second or third embodiment of the present invention is mounted.

First, FIG. 1 to FIG. 6 show the first embodiment of the present invention. In FIG. 1, on the lower side (road surface side) of a vehicle body 1 forming a body of the vehicle, left front and right front wheels 2A, 2B (front wheels) and left rear and right rear wheels 2C, 2D (rear wheels) are provided.

Air suspensions 3 form a fluid pressure device which adjusts a vehicle height H by a fluid pressure (air pressure). The air suspensions 3 are respectively provided to two wheels 2C, 2D (rear wheels) positioned on the rear side out of four wheels 2A to 2D of the vehicle. To be more specific, two air suspensions 3 are provided so as to respectively correspond to the two wheels 2C, 2D such that each air suspension 3 is interposed between the vehicle body 1 of the vehicle and the wheel 2C, 2D. Each air suspension 3 includes an air spring 4. The air suspensions 3 form a vehicle height adjustment actuator. Accordingly, the air suspensions 3 adjust the vehicle height H defined by a distance between the wheel 2C, 2D and the vehicle body 1 with the supply or discharge of air, serving as a working fluid, to or from the air suspensions 3.

When compressed air is supplied or discharged through branch pipe passages 14A, 14B and intake and exhaust valves 15, the air springs 4 are extended or contracted in the vertical direction corresponding to the amount of supply or discharge (amount of air) at this point. With such operations, the air suspensions 3 individually perform a vehicle height adjustment for the vehicle body 1 so that a vehicle height H is increased or decreased individually for each wheel 2C, 2D.

An air compressor module 5 includes an air compressor 6 and an electric motor 7, and forms a hydraulic/pneumatic pump which is operated with the supply of power from a battery 21. The air compressor module 5 is mounted on a rear portion side of the vehicle body 1, for example, and supplies compressed air to the air springs 4 of the air suspensions 3.

The air compressor 6 is formed of a reciprocating compressor, a scroll compressor, or other compressor, for example. Check valves 6A are respectively provided to the suction side and the discharge side of the air compressor 6. The air compressor 6 is driven by the electric motor 7 serving as a drive source. The air compressor 6 compresses outside air or atmosphere which the compressor 6 sucks from the suction filter 8 side, thus generating compressed air (air). A suction filter 8 also functions as a silencer which reduces suction noises.

Figure 2:
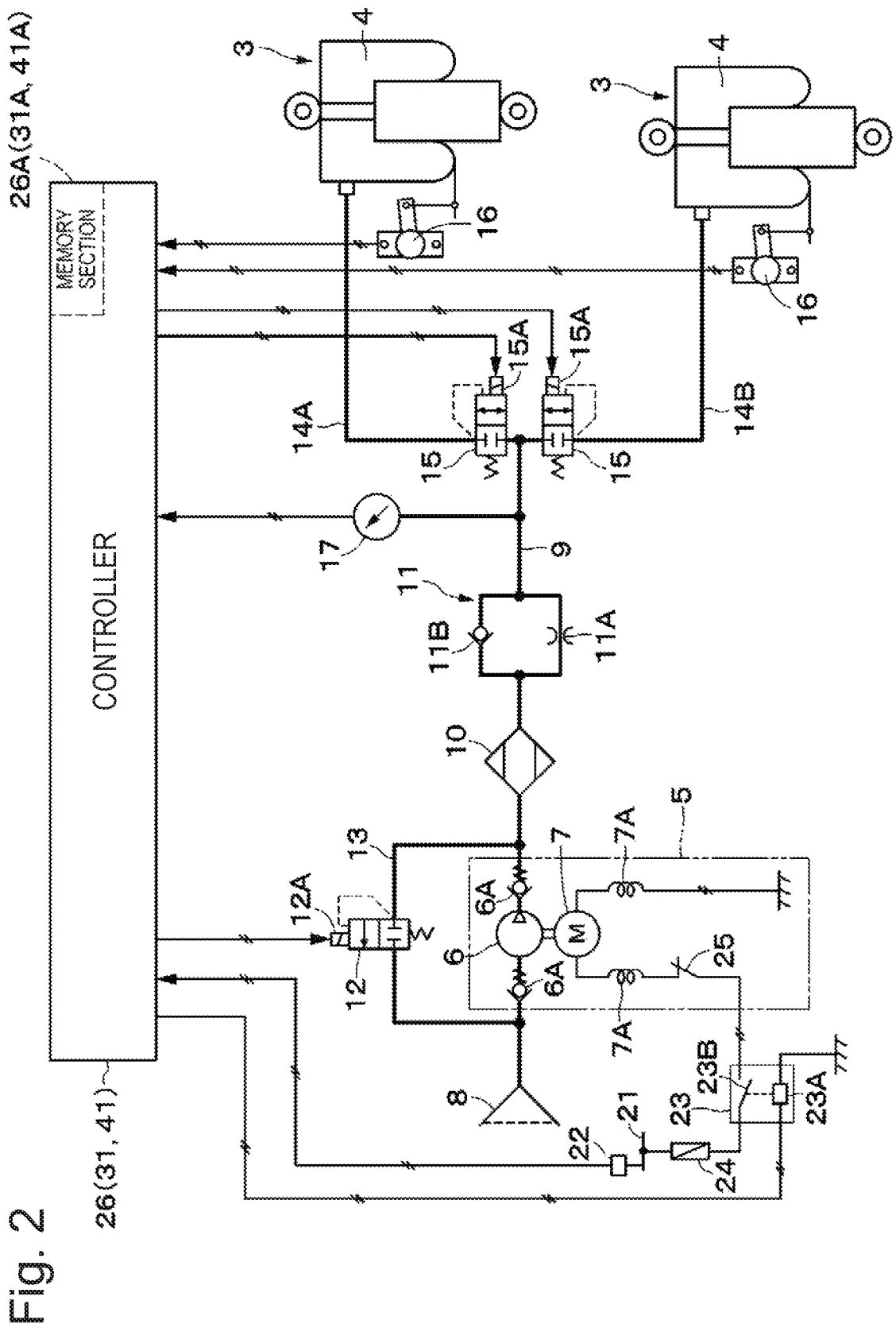
FIG. 2 is a circuit configuration diagram showing the vehicle height adjustment device in FIG. 1.

An intake and exhaust pipe passage 9 is provided to be connected to the discharge side of the air compressor 6. As shown in FIG. 2, one side (proximal end side) of the intake and exhaust pipe passage 9 is connected to the discharge side of the air compressor 6, and the other side (distal end side) of the intake and exhaust pipe passage 9 extends to the outside of the air compressor module 5. The branch pipe passages 14A, 14B are connected to the distal end side of the intake and exhaust pipe passage 9.

An air dryer 10 is interposed at an intermediate portion of the intake and exhaust pipe passage 9, and dries air. The air dryer 10 incorporates a moisture absorbent (not shown in the drawing) or the like, for example, and is disposed between a slow return valve 11 and an exhaust pipe passage 13. The slow return valve 11 has a parallel circuit formed of a throttle 11A and a check valve 1113. The check valve 1113 is opened with respect to a flow in a forward direction from the air compressor 6 toward the air suspensions 3, and a flow rate of compressed air is not reduced. On the other hand, the check valve 1113 is closed with respect to a flow in the reverse direction. At this point of operation, a flow rate of compressed air is reduced by the throttle 11A and hence, the compressed air slowly flows backward in the air dryer 10 at a small flow rate.

When compressed air generated by the air compressor 6 flows through the air dryer 10 in the forward direction toward the air suspension 3 side, the air dryer 10 causes this compressed air to come into contact with the moisture absorbent disposed in the inside of the air dryer 10 thus absorbing moisture so that the air dryer 10 supplies the dried compressed air toward the air springs 4. On the other hand, when compressed air (exhaust gas) discharged from the air springs 4 flows through the inside of the air dryer 10 in the reverse direction, the dried air flows backward through the inside of the air dryer 10. At this point of operation, moisture of the moisture absorbent in the air dryer 10 is desorbed by the dried air. With such a mechanism, the moisture absorbent is regenerated, thus being returned to a state of being able to absorb moisture again.

An exhaust valve 12 (exhaust valve) discharges air (working fluid) on the discharge side of the air compressor module 5 (air compressor 6). The exhaust valve 12 is connected to the intake and exhaust pipe passage 9 through the exhaust pipe passage 13. The exhaust valve 12 includes a solenoid (coil) 12A, and is formed of a two-poll, two-position electromagnetic switching valve (normally closed valve of a spring offset type), for example. The exhaust valve 12 is normally closed, thus blocking the exhaust pipe passage 13. When the solenoid 12A of the exhaust valve 12 is excited by the energization from a controller 26, the exhaust valve 12 is opened, thus allowing the communication of the exhaust pipe passage 13. With such operations, the exhaust valve 12 discharges (releases) compressed air in the intake and exhaust pipe passage 9 into the atmosphere.

Two branch pipe passages 14A, 14B are branched from the intake and exhaust pipe passage 9 corresponding to the wheels 2C, 2D, and extend toward the air suspensions 3 of the wheels 2C, 2D. These two branch pipe passages 14A, 14B connect the air compressor module 5 and the air springs 4 of the air suspensions 3 to each other. The branch pipe passages 14A, 14B are branched from a distal end portion of the intake and exhaust pipe passage 9 so as to connect the air springs 4 to the intake and exhaust pipe passage 9.

Intake and exhaust valves 15 are respectively provided between the air compressor module 5 and the air suspensions 3. To be more specific, each intake and exhaust valve 15 is positioned between the air compressor 6 of the air compressor module 5 and the air spring 4 of the air suspension 3, is provided to the two branch pipe passages 14A, 14B. The intake and exhaust valve 15 has the same configuration as the exhaust valve 12. That is, the intake and exhaust valve 15 includes a solenoid 15A, and is formed of a two-port, two-position electromagnetic switching valve, for example. The intake and exhaust valve 15 is formed as a normally closed valve of a spring offset type. In this embodiment, the description is made with respect to the configuration which uses the intake and exhaust valve 15 where an intake valve and an exhaust valve are integrally formed. However, the intake valve and the exhaust valve may be provided separately.

The solenoid 15A is electrically connected to the controller 26. By supplying power from the controller 26 to the solenoid 15A, the intake and exhaust valve 15 sucks (moves) a plunger (not shown in the drawing) against a force of the spring, thus being opened. In such a valve open state, compressed air can be supplied to or discharged from the air suspensions 3. On the other hand, by stopping the supply of power to the solenoid 15A, the intake and exhaust valve 15 is closed by the force of the spring. In such a valve closed state, the intake and exhaust valve 15 can stop supply or discharge of compressed air to or from the air suspensions 3.

A vehicle height sensor 16 is provided to each air suspension 3. The vehicle height sensor 16 forms a part of a detection device which detects physical quantities varying when upward or downward movement of the vehicle body 1 is restricted due to contact with an external contacted object. That is, the vehicle height sensor 16 is a vehicle height detection device, and detects a vehicle height H (vehicle height value) of the air suspension 3 based on a length dimension (a dimension in the upward or downward direction) of the air spring 4 in a direction in which the air spring 4 is extended or contracted. The vehicle height sensor 16 outputs a detection signal of the vehicle height H to the controller 26.

A pressure sensor 17 is also provided to the intake and exhaust pipe passage 9 at a position between the slow return valve 11 and the intake and exhaust valves 15. The pressure sensor 17 forms a part of the detection device which detects the physical quantities varying when the upward or downward movement of the vehicle body 1 is restricted due to a contact with an external contacted object. That is, the pressure sensor 17 is a pressure detection device which detects an air pressure acting on the air suspensions 3. Accordingly, the pressure sensor 17 detects a pressure P (pressure value) of compressed air (air) on the discharge side of the air compressor module 5 (air compressor 6). To be more specific, the pressure sensor 17 detects the pressure P of the compressed air supplied to the air springs 4. The pressure sensor 17 outputs a detection signal of the pressure P to the controller 26.

Next, an electric circuit for driving the air compressor 6 and the electric motor 7 is described with reference to FIG. 2.

The battery 21 is provided to the vehicle. A positive terminal of the electric motor 7 is connected to the battery 21, serving as a power source, through a compressor relay 23 and a fuse 24. A voltage sensor 22, which detects a battery voltage V, is connected to the battery 21. The voltage sensor 22 detects the battery voltage V, and outputs a detection signal of the battery voltage V to the controller 26.

A negative terminal of the electric motor 7 is connected to the ground. Choke coils 7A for suppressing an inrush current or the like are respectively connected to the positive terminal and the negative terminal of the electric motor 7. A thermal relay 25 between the choke coil 7A and the battery 21 is also connected to the positive terminal of the electric motor 7.

The compressor relay 23 (relay) connects the battery 21 and the air compressor module 5 with each other. The compressor relay 23 includes a coil 23A and a contact 23B. The compressor relay 23 is configured such that the contact 23B normally assumes an OFF state, and the contact 23B is switched to an ON state when an electric current flows through the coil 23A by the controller 26. When the contact 23B assumes an ON state, the compressor relay 23 connects the battery 21 and the electric motor 7 of the air compressor module 5 with each other.

The controller 26 forms an actuator control device which controls the air suspensions 3 such that the vehicle height H approximates to a target vehicle height Ht. The controller 26 controls driving and stopping of the air compressor module 5 including the air compressor 6 and the electric motor 7. In addition to the above, the controller 26 controls opening and closing of the exhaust valve 12 and the intake and exhaust valves 15. The input side of the controller 26 is connected to the vehicle height sensor 16, to the pressure sensor 17, and to the voltage sensor 22. The output side of the controller 26 is connected to the coil 23A of the compressor relay 23, to the solenoid 12A of the exhaust valve 12, and to the solenoids 15A of the intake and exhaust valves 15.

The controller 26 includes a memory section 26A formed of a ROM, a RAM, a nonvolatile memory and the like, for example. The memory section 26A stores, for example, a program and the like for vehicle height adjustment control processing shown in FIG. 3. By performing the program stored in the memory section 26A, the controller 26 controls the air suspensions 3, thus adjusting a vehicle height H of the vehicle. To be more specific, based on detection signals input into the controller 26 from the vehicle height sensor 16, the pressure sensor 17 and the like, the controller 26 controls an electric current to be supplied to the electric motor 7 and, controls an electric current to be supplied to the solenoid 12A of the exhaust valve 12 and the solenoids 15A of the intake and exhaust valves 15.

Figure 3:
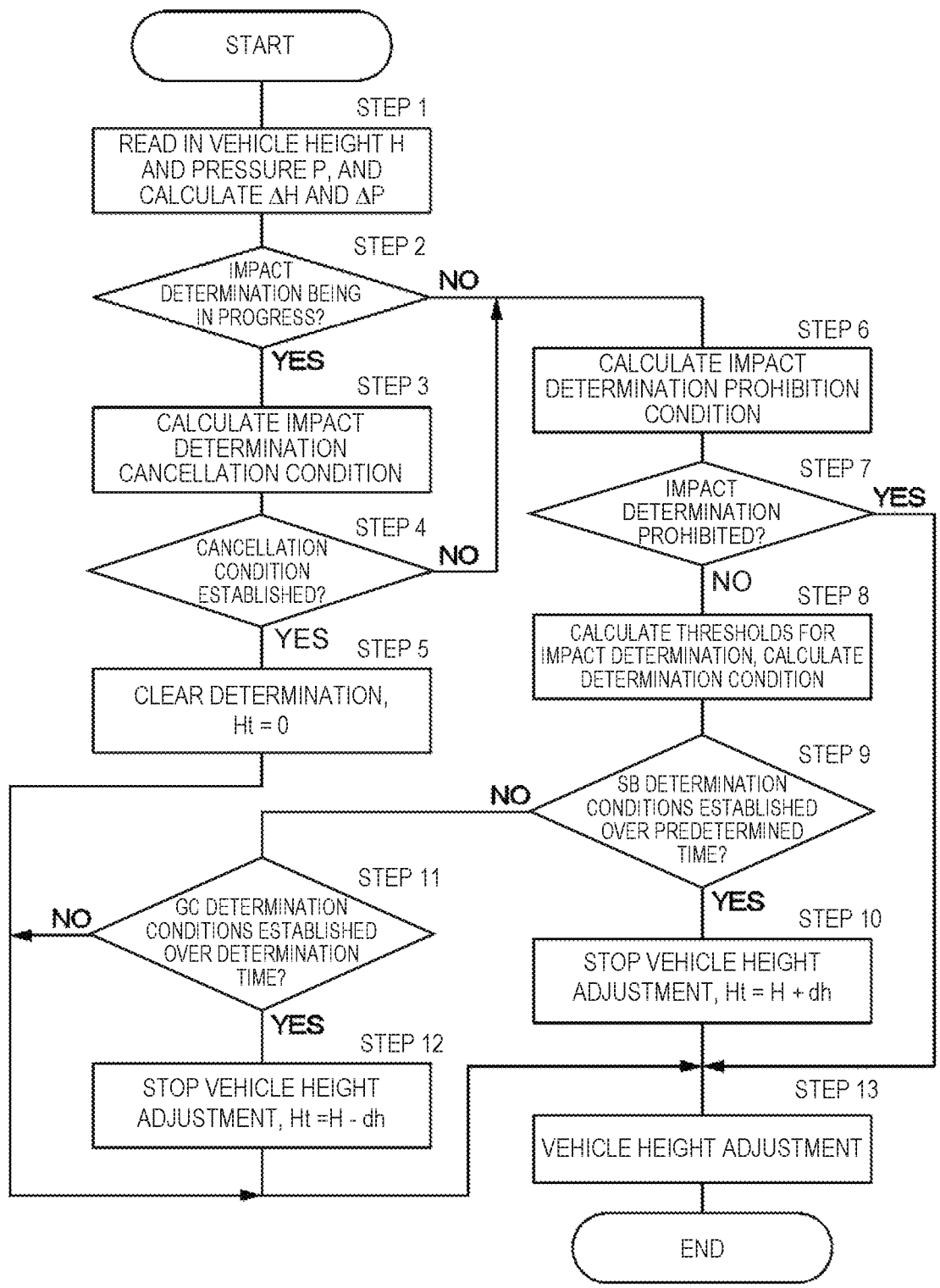
FIG. 3 is a flow chart showing vehicle height adjustment control processing performed by a controller in FIG. 2.

Next, the vehicle height adjustment control processing performed by the controller 26 is described with reference to FIG. 1 to FIG. 9. The vehicle height adjustment control processing shown in FIG. 3 is actuated at the start of a vehicle height adjustment, for example, and is repeatedly performed at a predetermined time interval.

In the vehicle height adjustment control processing shown in FIG. 3, it is determined whether or not the vehicle body 1 rides on an obstacle which is an external contacted object on the ground side in a snow bank determination (hereinafter referred to as "SB determination"). In a garage ceiling determination (hereinafter referred to as "GC determination"), it is determined whether or not the vehicle body 1 comes into contact with an obstacle which is an external contacted object on the upper side.

First, in step 1, the controller 26 reads in a vehicle height H and a pressure P with detection signals from the vehicle height sensor 16 and the pressure sensor 17. At this point of operation, as well as the vehicle height H and the pressure P, the controller 26 also reads in a battery voltage V with a detection signal from the voltage sensor 22. In addition to the above, for example, based on a difference between a vehicle height H in the previous cycle which is stored and a vehicle height H in the present cycle which is detected by the vehicle height sensor 16, the controller 26 calculates a vehicle height variation rate $\Delta H$ as a variation rate of vehicle height H per unit time. In the same manner, for example, based on a difference between a pressure P in the previous cycle and a pressure P in the present cycle, the controller 26 calculates a pressure variation rate $\Delta P$ as a variation rate of pressure P per unit time.

In the following step 2, it is determined whether or not the SB determination or the GC determination is in progress. When it is determined "NO" in step 2, it is a start point of the vehicle height adjustment control processing, and thus processing in step 6 and following steps are performed. On the other hand, when it is determined "YES" in step 2, the vehicle height adjustment control processing is in progress, and thus the processing proceeds to step 3.

In step 3, a condition for cancelling an impact determination (SB determination or GC determination) with respect to an obstacle is calculated. To be more specific, based on a signal from a vehicle speed sensor (not shown in the drawing) or the like, a vehicle speed (5 km/h, for example) for determining whether or not the vehicle is in a traveling state is set. In addition to the above, a condition for determining an OFF state of a power source is set. The value of a vehicle speed for determining whether or not the vehicle is in a traveling state is not limited to the exemplified value, and is set appropriately.

In the following step 4, it is determined whether or not the cancellation condition set in step 3 is established. To be more specific, the controller 26 determines whether or not the vehicle is in a traveling state, or whether or not the power source is in an OFF state.

When it is determined "YES" in step 4, the cancellation condition is established. To be more specific, the vehicle is in a traveling state or the power source is in an OFF state. Accordingly, the processing proceeds to step 5 where the results of the SB determination and the GC determination are cleared and, at the same time, a target vehicle height Ht is set to an initial value which is zero (Ht=0). After step 5 is finished, the processing proceeds to step 13.

On the other hand, when it is determined "NO" in step 4, the cancellation condition is not established. To be more specific, the vehicle is in a stopped state, and the power source is in an ON state. Accordingly, the processing proceeds to step 6 where an impact determination prohibition conditions are calculated.

To be more specific, as shown in FIG. 4, the following prohibition conditions 1 to 5 are set. The prohibition condition 1 is that the vehicle height H, which is detected by the vehicle height sensor 16, is higher than 90% of a fully extended vehicle height Hfr at which the air suspensions 3 are fully extended (H>Hfr×0.9). The prohibition condition 2 is that the vehicle height H is lower than 90% of a fully contracted vehicle height Hfj at which the air suspensions 3 are fully contracted (H<Hfj×0.9). The prohibition condition 3 is that a system has no abnormality. The prohibition condition 4 is that a door of the vehicle is open. The prohibition condition 5 is that a vehicle is in a traveling state.

A value for determining whether or not the vehicle height H is in the vicinity of the fully extended vehicle height Hfr is not limited to 90% of the fully extended vehicle height Hfr. In the same manner, a value for determining whether or not the vehicle height H is in the vicinity of the fully contracted vehicle height Hfj is not limited to 90% of the fully contracted vehicle height Hfj. Each of these values is a margin with respect to the vehicle height Hfr, Hfj, and is appropriately set within a range of 75% to 95%, for example, based on a situation where an erroneous determination occurs.

In the following step 7, it is determined whether or not the impact determination is prohibited. To be more specific, the controller 26 determines whether or not at least one of the prohibition conditions 1 to 5, which are set in step 6, is satisfied.

When it is determined "YES" in step 7, any one of the prohibition conditions 1 to 5 is satisfied and hence, the controller 26 maintains the target vehicle height Ht at the current value, and the processing proceeds to step 13.

On the other hand, when it is determined "NO" in step 7, none of the prohibition conditions 1 to 5 is satisfied and hence, the vehicle is in a state where the impact determination can be performed. Accordingly, the processing proceeds to step 8 where thresholds ΔHsb1, ΔHgc1, ΔPsb1, ΔPgc1, which are used for the SB determination and the GC determination, are calculated.

Relationships shown in FIG. 7 to FIG. 9 are established between a current vehicle height H, a current pressure P, a current battery voltage V, a vehicle height variation rate ΔH, and a pressure variation rate ΔP, for example.

That is, as shown in FIG. 7, when the vehicle height H is increased to a high position, the vehicle height H approximates to the vehicle height at which the air suspensions 3 are fully extended and hence, the vehicle height variation rate ΔH becomes small, while the pressure variation rate ΔP becomes large. When the vehicle height H is in the vicinity of zero (initial value), the vehicle height H is between the vehicle height at which the air suspensions 3 are fully extended and the vehicle height at which the air suspensions 3 are fully contracted. Accordingly, in both a case where the vehicle height H is increased and a case where the vehicle height H is decreased, the vehicle height variation rate ΔH becomes large, while the pressure variation rate ΔP becomes small. When the vehicle height H is decreased to a low position, the vehicle height H approximates to the vehicle height at which the air suspensions 3 are fully contracted and hence, the vehicle height variation rate ΔH becomes small, while the pressure variation rate ΔP becomes large. The relationship between the vehicle height H and the variation rates ΔH, ΔP vary according to characteristics of the air springs 4. Accordingly, FIG. 7 shows one example of the relationship between the vehicle height H and the variation rates ΔH, ΔP.

As shown in FIG. 8, when the pressure P is high at the time of increasing the vehicle height H, both the vehicle height variation rate ΔH and the pressure variation rate ΔP become small. When the pressure P is low at the time of increasing the vehicle height H, both the vehicle height variation rate ΔH and the pressure variation rate ΔP become large. When the pressure P is high at the time of decreasing the vehicle height H, both the vehicle height variation rate ΔH and the pressure variation rate ΔP become large. When the pressure P is low at the time of decreasing the vehicle height H, both the vehicle height variation rate ΔH and the pressure variation rate ΔP become small. The relationship between the pressure P and the variation rates ΔH, ΔP vary according to characteristics of the air springs 4. Accordingly, FIG. 8 shows one example of the relationship between the pressure P and the variation rates ΔH, ΔP.

As shown in FIG. 9, when the battery voltage V is high, compressed air supply capability of the air compressor module 5 increases and hence, both the vehicle height variation rate ΔH and the pressure variation rate ΔP become large. When the battery voltage V is low, compressed air supply capability of the air compressor module 5 becomes low and hence, both the vehicle height variation rate ΔH and the pressure variation rate ΔP become small.

Thresholds ΔHsb1, ΔHgc1 of the vehicle height variation rate ΔH and thresholds ΔPsb1, ΔPgc1 of the pressure variation rate ΔP are calculated based on the current vehicle height H, the current pressure P, and the current battery voltage V by taking into account the characteristics shown in FIG. 7 to FIG. 9.

That is, the threshold ΔHgc1 of the vehicle height variation rate ΔH and the threshold ΔPgc1 of the pressure variation rate ΔP, which are used for the GC determination, are calculated based on the current vehicle height H, the current pressure P, and the current battery voltage V. On the other hand, the threshold ΔHsb1 of the vehicle height variation rate ΔH and the threshold ΔPsb1 of the pressure variation rate ΔP, which are used for the SB determination, are calculated based on the current vehicle height H and the current pressure P. Snow bank occurs when the vehicle height H is decreased. At the time of decreasing the vehicle height H, the air compressor module 5 is not driven, and compressed air is discharged to the atmosphere by opening the exhaust valve 12. Accordingly, in calculating the thresholds ΔHsb1, ΔPsb1, which are used for the SB determination, it is unnecessary to take into account a battery voltage V.

An air pressure circuit is a closed circuit. Accordingly, for driving the air compressor module 5 also in decreasing the vehicle height H, it is necessary to take into account a battery voltage V also in calculating the thresholds ΔHsb1, ΔPsb1, which are used for the SB determination.

Further, in step 8, impact determination conditions are calculated in addition to the thresholds ΔHsb1, ΔHgc1, ΔPsb1, ΔPgc1. To be more specific, the SB determination conditions 1(1) to 5(1) shown in FIG. 5 and the GC determination conditions 1(1) to 5(1) shown in FIG. 6 are set.

The SB determination condition 1(1) is that the vehicle is in a stopped state, all doors are closed, a system has no abnormality, and the detected vehicle height H is higher than 90% of the fully extended vehicle height Hfr at which the air suspensions 3 are fully extended (H>Hfr×0.9). The SB determination condition 2(1) is that a maximum value ΔHmax of the vehicle height variation rate ΔH is a negative value, and is larger than the threshold ΔHsb1 (0>ΔHmax>ΔHsb1). The SB determination condition 3(1) is that the pressure variation rate ΔP is smaller than the threshold ΔPsb1 (ΔP<ΔPsb1). The SB determination condition 4(1) is that a current command Ipv (current value) for the intake and exhaust valves 15 is larger than a drive current value Ipv0 which is determined in advance. (Ipv0=0.2 A, for example). The SB determination condition 5(1) is that a current command Iv (current value) for the exhaust valve 12 is larger than a drive current value Iv0 which is determined in advance (Iv0=0.4 A, for example).

The GC determination condition 1(1) is that the vehicle is in a stopped state, all doors are closed, a system has no abnormality, and the detected vehicle height H is lower than 90% of the fully contracted vehicle height Hfj at which the air suspensions 3 are fully contracted (H<Hfj×0.9). The GC determination condition 2(1) is that a minimum value ΔHmin of the vehicle height variation rate ΔH is a positive value, and is smaller than the threshold ΔHgc1 (0<ΔHmin<ΔHge1). The GC determination condition 3(1) is that a pressure variation rate ΔP is larger than the threshold ΔPgc1 (ΔP>ΔPgc1). The GC determination condition 4(1) is that a drive command for the air compressor 6 is in an ON state (in an output state). The GC determination condition 5(1) is that the current command Ipv (current value) for the intake and exhaust valves 15 is larger than a drive current value Ipv0 which is determined in advance (Ipv0=0.2 A, for example).

The maximum value ΔHmax and the minimum value ΔHmin of the vehicle height variation rate ΔH show the maximum value and the minimum value of the vehicle height variation rate ΔH which are calculated in the present control period. Specific numerical values of the drive current values Ipv0, Iv0 are merely for the sake of example, and are appropriately set for respective actual vehicles.

In the following step 9, it is determined whether or not all SB determination conditions 1(1) to 5(1) are established over a specific time. At this point of operation, the specific time is set to a short time (2 seconds, for example) in a state where neither the snow bank (SB) nor the garage ceiling (GC) is determined. After the garage ceiling is determined in the previous detection, the specific time is set to a long time (10 seconds, for example).

When it is determined "YES" in step 9, it is considered that a lower surface of the vehicle body 1 comes into contact with an obstacle at the time of decreasing the vehicle height H. Accordingly, the processing proceeds to step 10 where, in addition to stopping the vehicle height adjustment, the controller 26 sets a target vehicle height Ht to a value obtained by adding an impact avoidance amount dh (dh=10 mm, for example) to the current vehicle height H (Ht=H+dh). With such setting, the target vehicle height Ht is set to a value which causes the vehicle height H to be increased by the impact avoidance amount dh. By taking into account a weight and the like of the vehicle, the impact avoidance amount dh is set to a value which allows the vehicle to avoid an impact state. After step 9 is finished, the processing proceeds to step 13.

On the other hand, when it is determined "NO" in step 9, it is considered that the snow bank is not occurring. Accordingly, the processing proceeds to step 11 where it is determined whether or not all GC determination conditions 1(1) to 5(1) are established over a specific time. At this point of operation, the specific time is set to a short time (2 seconds, for example) in a state where neither the snow bank nor the garage ceiling is determined. After the snow bank is determined in the previous detection, the specific time is set to a long time (10 seconds, for example). The specific time is not limited to an exemplified numerical value, and is appropriately set by taking into account a situation where an erroneous determination occurs.

When it is determined "YES" in step 11, it is considered that an upper surface of the vehicle body 1 comes into contact with an obstacle at the time of increasing the vehicle height H. Accordingly, the processing proceeds to step 12 where, in addition to stopping the vehicle height adjustment, the controller 26 sets the target vehicle height Ht to a value obtained by subtracting the impact avoidance amount dh from the current vehicle height H (Ht=H−dh). With such setting, the target vehicle height Ht is set to a value which causes the vehicle height H to be decreased by the impact avoidance amount dh. After step 9 is finished, the processing proceeds to step 13.

On the other hand, when it is determined "NO" in step 11, it is considered that neither the snow bank nor the garage ceiling is occurring. Accordingly, the processing proceeds to step 13 in a state where the target vehicle height Ht is maintained at a current value.

In step 13, the controller 26 performs the vehicle height adjustment so as to assume the target vehicle height Ht. That is, when the target vehicle height Ht is higher than the current vehicle height H, the controller 26 causes the vehicle body 1 to be elevated. On the other hand, when the target vehicle height Ht is lower than the current vehicle height H, the controller 26 causes the vehicle body 1 to be lowered. When the target vehicle height Ht is a value close to the current vehicle height H, the controller 26 stops an elevating or lowering operation for the vehicle body 1 so as to maintain the current vehicle height H.

Next, an operation for detecting the snow bank or the garage ceiling which is performed by the controller 26 is described with reference to FIG. 10 to FIG. 13.

First, the description is made with respect to the case where a lower portion of the vehicle body 1 impacts with the obstacle at the time of lowering the vehicle body 1 so that the snow bank occurs.

Figure 10:
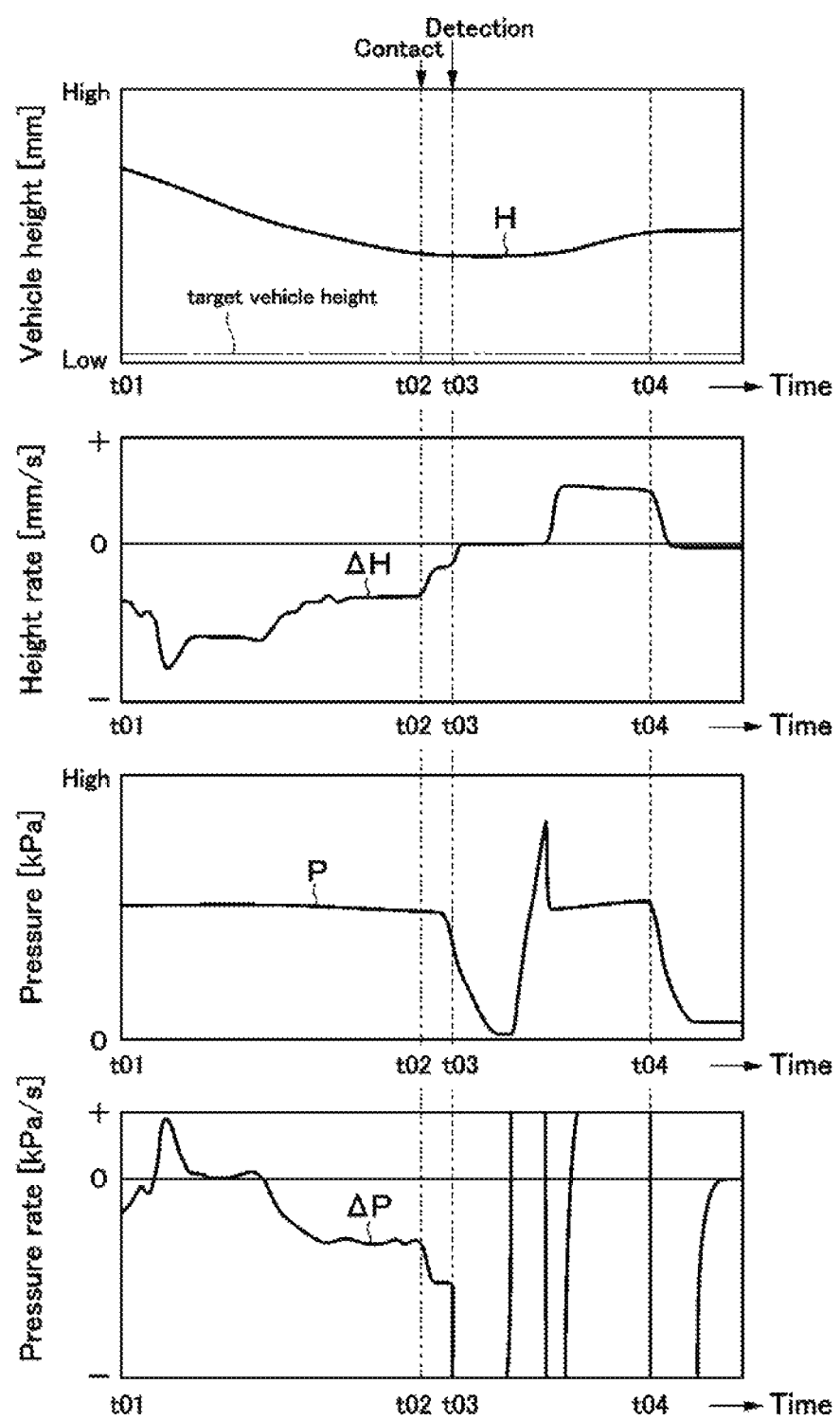
FIG. 10 is a characteristic diagram showing one example of temporal variations in vehicle height, vehicle height variation rate, pressure, and pressure variation rate when snow bank occurs in the process of lowering a vehicle body.

FIG. 12(a) shows a state where the vehicle body 1 is lowered by performing the vehicle height adjustment. As shown in FIG. 12(a), when the vehicle height adjustment device is operated in a state where the vehicle height H is higher than the target vehicle height Ht, the controller 26 opens the exhaust valve 12 and the intake and exhaust valves 15. With such operations, air is discharged from the air suspensions 3 and hence, the air suspensions 3 contract so that the vehicle body 1 is lowered. At this point of operation, the vehicle height H decreases as shown in FIG. 10 between time t01 to t02. With such a decrease, although the pressure P tends to decrease (assumes a negative value), a variation in the pressure P is relatively small.

FIG. 12(b) shows a state where the snow bank occurs in the process of lowering the vehicle body 1. As shown in FIG. 12(b), when the lower portion of the vehicle body 1 impacts with the obstacle in the process of lowering the vehicle body 1, the lowering of the vehicle body 1 is obstructed by the obstacle. At this point of operation, if air is discharged from the air suspensions 3, lowering of the vehicle body 1 is prevented. Accordingly, as shown in FIG. 10 between time t02 to t03, compared to values before the vehicle impacts with the obstacle, the vehicle height H is fixed at a specific value, and the pressure P starts to drop significantly. As a result, the maximum value $\Delta$Hmax of the vehicle height variation rate $\Delta$H becomes larger than the threshold $\Delta$Hsb1, and the pressure variation rate $\Delta$P becomes smaller than the threshold $\Delta$Psb1. That is, the pressure variation rate $\Delta$P assumes a negative value, and the absolute value of the pressure variation rate $\Delta$P becomes large. When such a state is continued over a specific time or more, the controller 26 determines that the snow bank is occurring.

To avoid the snow bank, the controller 26 stops the operation of the vehicle height adjustment, and causes the vehicle body 1 to displace toward a direction (elevating direction) opposite to the direction in the lowering operation by the impact avoidance amount dh. To be more specific, after switching the exhaust valve 12 from an open state to a closed state, the controller 26 drives the air compressor module 5 so as to supply compressed air to the air suspensions 3. With such operations, the pressure P increases and the vehicle height H increases as shown in FIG. 10 between time t03 to t04. As a result, as shown in FIG. 12(c), the vehicle body 1 is elevated, thus being separated from the obstacle and hence, the vehicle becomes able to move. FIG. 12(e) shows a state where the vehicle body 1 is elevated after the snow bank is detected.

Next, the description is made with respect to the case where an upper portion of the vehicle body 1 impacts with the obstacle at the time of elevating the vehicle body 1 so that the garage ceiling occurs.

Figure 11:
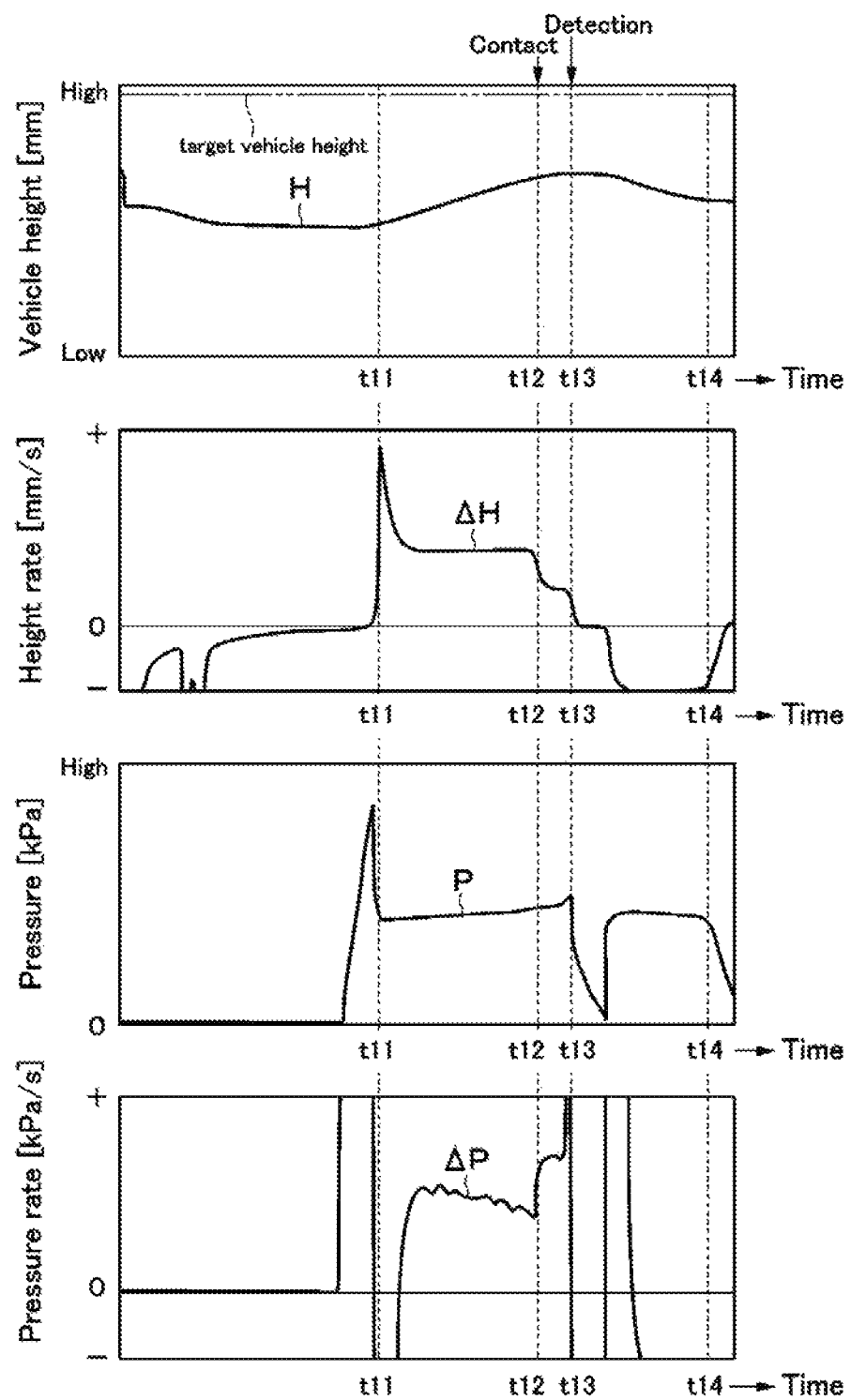
FIG. 11 is a characteristic diagram showing one example of temporal variations in vehicle height, vehicle height variation rate, pressure, and pressure variation rate when garage ceiling occurs in the process of elevating the vehicle body.

FIG. 13(a) shows a state where the vehicle body 1 is elevated by performing the vehicle height adjustment. As shown in FIG. 13(a), when the vehicle height adjustment device is operated in a state where the vehicle height H is lower than the target vehicle height Ht, the controller 26 drives the air compressor module 5 while the exhaust valve 12 is closed and the intake and exhaust valves 15 are opened. With such operations, compressed air is supplied to the air suspensions 3 and hence, the air suspensions 3 extend so that the vehicle body 1 is elevated. At this point of operation, the vehicle height H increases as shown in FIG. 11 between time t11 to t12. With such an increase, although the pressure P tends to increase (assumes a positive value), a variation in the pressure P is relatively small.

FIG. 13(b) shows a state where the garage ceiling occurs in the process of elevating the vehicle body 1. As shown in FIG. 13(b), when the upper portion of the vehicle body 1 impacts with the obstacle in the process of elevating the vehicle body 1, the elevating of the vehicle body 1 is obstructed by the obstacle. At this point of operation, if compressed air is supplied to the air suspensions 3, elevating of the vehicle body 1 is prevented. Accordingly, as shown in FIG. 11 between time t12 to t13, compared to values before the vehicle impacts with the obstacle, the vehicle height H is fixed at a specific value, and the pressure P starts to increase significantly. As a result, the minimum value $\Delta$Hmin of the vehicle height variation rate $\Delta$H becomes smaller than the threshold $\Delta$Hgc1, and the pressure variation rate $\Delta$P becomes larger than the threshold $\Delta$Pgc1. When such a state is continued over a specific time or more, the controller 26 determines that the garage ceiling is occurring.

To avoid the garage ceiling, the controller 26 stops the operation of the vehicle height adjustment, and causes the vehicle body 1 to displace toward a direction (lowering direction) opposite to the direction in the elevating operation by the impact avoidance amount dh. To be more specific, the controller 26 opens the exhaust valve 12 so as to discharge air from the air suspensions 3. With such operations, the pressure P decreases and the vehicle height H decreases as shown in FIG. 11 between time t13 to t14. As a result, as shown in FIG. 13(c), the vehicle body 1 is lowered, thus being separated from the obstacle and hence, the vehicle becomes able to move. FIG. 13(c) shows a state where the vehicle body 1 is lowered after the garage ceiling is detected.

Thus, according to the vehicle height adjustment device of the first embodiment, when the vehicle height sensor 16 and the pressure sensor 17 determines that the movement of the vehicle body 1 is restricted, based on detected values (vehicle height H, pressure P) of the vehicle height sensor 16 and the pressure sensor 17, the controller 26 stops the upward or downward movement of the vehicle body 1 so as to restrict the movement of the vehicle body 1, and switches the movement of the vehicle body 1 to the movement in the opposite direction. With such operations, even when an obstacle, which is an external contacted object, is disposed at either a position above the vehicle body 1 or a position below the vehicle body 1, an impact between the vehicle body 1 and an object can be detected with high accuracy. In addition to the above, when the movement of the vehicle body 1 is restricted, the vehicle body 1 is moved in a direction opposite to the moving direction in the vehicle height adjustment. Accordingly, the vehicle body 1 is separated from the obstacle, thus suppressing a damage of the vehicle and, the vehicle can be brought into a moveable state.

Further, the thresholds $\Delta$Hsb1, $\Delta$Psb1, which are used for the SB determination, and the thresholds $\Delta$Hgc1, $\Delta$Pgc1, which are used for the GC determination, vary corresponding to the pressure P and the vehicle height H. Accordingly, the SB determination and the GC determination can be performed by taking into account characteristics of the air springs 4 and characteristics of bump rubber.

As shown in the prohibition conditions 1, 2 in FIG. 4, when the vehicle height H is in the vicinity of the fully extended vehicle height Hfr, at which the air suspensions 3 are fully extended, or in the vicinity of the fully contracted vehicle height Hfj, at which the air suspensions 3 are fully contracted, the controller 26 does not perform the SB determination and the GC determination. For example, when the air springs 4 are in a high pressure state, the vehicle height H may only slightly decrease even if a discharging operation is performed. Further, when the air springs 4 are in an extremely low pressure state, the vehicle height H may only slightly increase even if air supplying operation is performed. An impact with the obstacle is not determined when the variation in vehicle height H is small as described above and hence, erroneous determinations can be suppressed.

In addition to the above, as shown in the prohibition conditions 3 to 5, in a situation where an erroneous determination is expected, the controller 26 is prohibited from determining an impact with an obstacle. Accordingly, erroneous determinations can be suppressed.

Next, FIG. 1 to FIG. 4, FIG. 14, and FIG. 15 show a second embodiment of the present invention. The second embodiment is characterized in that thresholds of a vehicle height variation rate and a pressure variation rate, which are used for an impact determination, are calculated based on past measurements of vehicle height variation rates and pressure variation rates. In the second embodiment, constitutional elements equal to the corresponding constitutional elements in the above-mentioned first embodiment are given the same reference numerals, and the description of such constitutional elements is omitted.

A controller 31 according to the second embodiment is configured generally equal to the controller 26 according to the first embodiment. Accordingly, in the same manner as the first embodiment, a memory section 31A of the controller 31 stores a program and the like for vehicle height adjustment control processing shown in FIG. 3. The controller 31 performs the vehicle height adjustment control processing shown in FIG. 3.

In step 6 in FIG. 3, the controller 31 sets SB determination conditions 1(2) to 5(2) shown in FIG. 14 and GC determination conditions 1(2) to 5(2) shown in FIG. 15 in place of the SB determination conditions 1(1) to 5(1) and the GC determination conditions 1(1) to 5(1) according to the first embodiment.

At this point of operation, the SB determination conditions 1(2), 4(2), 5(2) according to the second embodiment are equal to the SB determination conditions 1(1), 4(1), 5(1) according to the first embodiment. The GC determination conditions 1(2), 4(2), 5(2) according to the second embodiment are equal to the GC determination conditions 1(1), 4(1), 5(1) according to the first embodiment.

On the other hand, in the second embodiment, thresholds ΔHsb2, ΔPsb2, which are used in the SB determination conditions 2(2), 3(2), and thresholds ΔHgc2, ΔPgc2, which are used in the GC determination conditions 2(2), 3(2), differ from the thresholds ΔHsb1, ΔHgc1, ΔPsb1, ΔPgc1 which are used in the first embodiment.

To be more specific, the thresholds ΔHsb2, ΔHgc2 are calculated based on the following Formula 1 and Formula 2 by averaging past vehicle height variation amounts ΔH. Subscript k of the vehicle height variation amount ΔH denotes the number of retrospective measurements into the past. That is, a vehicle height variation amount ΔH with k=0 denotes a vehicle height variation amount ΔH which is measured in the present cycle. A vehicle height variation amount ΔH with k=1 denotes a vehicle height variation amount ΔH which is measured in the previous cycle. A vehicle height variation amount ΔH with k=N denotes a vehicle height variation amount ΔH which is measured in the Nth previous cycle.

Accordingly, the threshold ΔHsb2 denotes a value obtained by adding a margin dHsb to the average value of vehicle height variation amounts ΔH for (N+1) cycles total, where the vehicle height variation amount in the present cycle is added to the vehicle height variation amounts in the previous N cycles. In the same manner, the threshold ΔHgc2 denotes a value obtained by adding a margin dHgc to the average value of vehicle height variation amounts ΔH for (N+1) cycles total, where the vehicle height variation amount in the present cycle is added to the vehicle height variation amounts in the previous N cycles. The margins dHsb, dHgc are set in advance by taking into account a vehicle height variation amount ΔH and the like which are obtained from an actual vehicle, for example.

$$\Delta Hsb2 = \frac{\sum_{k=0}^{N}\Delta H_k}{1+N} + dH_{sb} \quad \text{[Formula 1]}$$

$$\Delta Hgc2 = \frac{\sum_{k=0}^{N}\Delta H_k}{1+N} + dH_{gc} \quad \text{[Formula 2]}$$

Further, the thresholds ΔPsb2, ΔPgc2 are calculated based on the following Formula 3 and Formula 4 by averaging past pressure variation amounts ΔP. Subscript k of the pressure variation amount ΔP denotes the number of retrospective measurements into the past. That is, a pressure variation amount ΔP with k=0 denotes a pressure variation amount ΔP which is measured in the present cycle. A pressure variation amount ΔP with k=1 denotes a pressure variation amount ΔP which is measured in the previous cycle. A pressure variation amount ΔP with k=N denotes a pressure variation amount ΔP which is measured in the Nth previous cycle.

Accordingly, the threshold ΔPsb2 denotes a value obtained by adding a margin dPsb to the average value of the pressure variation amounts ΔP for (N+1) cycles total, where the pressure variation amount in the present cycle is added to the pressure variation amounts in the previous N cycles. In the same manner, the threshold ΔPgc2 denotes a value obtained by adding a margin dPgc to the average value of the pressure variation amounts ΔP for (N+1) cycles total, where the pressure variation amount in the present cycle is added to the pressure variation amounts in the previous N cycles. The margins dPsb, dPgc are set in advance by taking into account a pressure variation amount ΔP and the like which are obtained from an actual vehicle, for example.

$$\Delta Psb2 = \frac{\sum_{k=0}^{N}\Delta P_k}{1+N} + dP_{sb} \quad \text{[Formula 3]}$$

$$\Delta Pgc2 = \frac{\sum_{k=0}^{N}\Delta P_k}{1+N} + dP_{gc} \quad \text{[Formula 4]}$$

The past vehicle height variation amounts ΔH and the number of cycles (N cycles) of the pressure variation amount ΔP, which are used for calculating the thresholds ΔHsb2, ΔHgc2, ΔPsb2, ΔPgc2, are appropriately set by taking into account a situation where an erroneous determination occurs.

In step 9 in FIG. 3, the controller 31 determines whether or not all SB determination conditions 1(2) to 5(2) are established over a specific time. When it is determined "YES" in step 9, the processing proceeds to step 10. In step 10, in addition to stopping the vehicle height adjustment, the controller 31 sets the target vehicle height Ht to a value obtained by adding an impact avoidance amount dh (dh=10 mm, for example) to the current vehicle height H (Ht=H+dh).

On the other hand, when it is determined "NO" in step 9, the processing proceeds to step 11. In step 11, the controller 31 determines whether or not all GC determination conditions 1(2) to 5(2) are established over a specific time. When it is determined "YES" in step 11, the processing proceeds to step 12. In step 12, in addition to stopping the vehicle height adjustment, the controller 31 sets the target vehicle height Ht to a value obtained by subtracting the impact avoidance amount dh from the current vehicle height H (Ht=H dh). When it is determined "NO" in step 11, the controller 31 maintains the target vehicle height Ht at the current value.

Thus, also in the second embodiment, generally the same operation and advantageous effects as the first embodiment can be acquired. The vehicle height variation amount ΔH and the pressure variation amount ΔP vary according to various conditions such as the vehicle height H, the pressure P, or the battery voltage V. Accordingly, in the first embodiment, the thresholds ΔHsb1, ΔHgc1, ΔPsb1, ΔPgc1 for the determination are calculated based on various conditions such as the vehicle height H, the pressure P, or the battery voltage V.

On the other hand, in the second embodiment, the thresholds ΔHsb2, ΔHgc2, ΔPsb2, ΔPgc2 used for the SB determination and the GC determination are successively set based on the vehicle height variation amount ΔH and the pressure variation amount ΔP which are actually measured. To be more specific, the controller 31 stores the vehicle height variation amount ΔH and the pressure variation amount ΔP after starting the vehicle height adjustment, and decides current thresholds ΔHsb2, ΔHgc2, ΔPsb2, ΔPgc2 based on the past vehicle height variation amount ΔH and the past pressure variation amount W which are stored. Accordingly, it becomes unnecessary to take into account the various conditions.

However, to decide the thresholds ΔHsb2, ΔHgc2, ΔPsb2, ΔPgc2, it is necessary to store the past vehicle height variation amount ΔH and the past pressure variation amount ΔP over a predetermined time, and contact to an obstacle cannot be detected at the time of starting the vehicle height adjustment. Accordingly, it may be configured such that the thresholds ΔHsb1, ΔHgc1, ΔPsb1, ΔPgc1 according to the first embodiment are used at the time of starting the vehicle height adjustment and, after a predetermined time elapses, the thresholds ΔHsb1, ΔHgc1, ΔPsb1, ΔPgc1 are switched to the thresholds ΔHsb2, ΔHgc2, ΔPsb2, ΔPgc2 according to the second embodiment.

Next, FIG. 1 to FIG. 4, FIG. 16 and FIG. 17 show a third embodiment of the present invention. The third embodiment is characterized in that the SB determination and the GC determination are performed based on a value obtained by dividing a pressure variation rate by a vehicle height variation rate. In the third embodiment, constitutional elements equal to the corresponding constitutional elements in the above-mentioned first embodiment are given the same reference numerals, and the description of such constitutional elements is omitted.

A controller 41 according to the third embodiment is configured generally equal to the controller 26 according to the first embodiment. Accordingly, in the same manner as the first embodiment, a memory section 41A of the controller 41 stores a program and the like for vehicle height adjustment control processing shown in FIG. 3. The controller 41 performs the vehicle height adjustment control processing shown in FIG. 3.

In step 6 in FIG. 3, the controller 41 sets SB determination conditions 1(3) to 6(3) shown in FIG. 16 and GC determination conditions 1(3) to 6(3) shown in FIG. 17 in place of the SB determination conditions 1(1) to 5(1) and the GC determination conditions 1(1) to 5(1) according to the first embodiment.

The SB determination condition 1(3) is that the vehicle is in a stopped state, all doors are closed, and a system has no abnormality. The SB determination condition 2(3) is that the detected vehicle height H is higher than 90% of the fully extended vehicle height Hfr at which the air suspensions 3 are fully extended (H>Hfr×0.9), or that the detected vehicle height H is lower than 90% of the fully contracted vehicle height Hfj at which the air suspensions 3 are fully contracted (H<Hfj×0.9). The SB determination condition 3(3) is that a maximum value ΔHmax of a vehicle height variation rate ΔH is a negative value (0>ΔHmax). The SB determination condition 4(3) is that a value obtained by dividing a pressure variation rate ΔP by a vehicle height variation rate ΔH (ΔP/ΔH) is larger than a threshold Rsb which is determined based on a vehicle height H and a pressure P (Rsb<ΔP/ΔH). The SB determination condition 5(3) is that the current command Ipv (current value) for the intake and exhaust valves 15 is larger than a predetermined drive current value Ipv0 (Ipv0=0.2 A, for example) (Ipv>Ipv0). The SB determination condition 6(3) is that a current command Iv (current value) for the exhaust valve 12 is larger than a predetermined drive current value Iv0 (Iv0=0.4 A, for example) (Iv>Iv0).

The GC determination condition 1(3) is that the vehicle is in a stopped state, all doors are closed, and a system has no abnormality. The GC determination condition 2(3) is that the detected vehicle height H is higher than 90% of the fully extended vehicle height Hfr at which the air suspensions 3 are fully extended (H>Hfr×0.9), or that the detected vehicle height H is lower than 90% of the fully contracted vehicle height HI) at which the air suspensions 3 are fully contracted (H>Hfj×0.9). The GC determination condition 3(3) is that a minimum value ΔHmin of the vehicle height variation rate ΔH is a positive value (0<ΔHmin). The GC determination condition 4(3) is that a value obtained by dividing a pressure variation rate ΔP by a vehicle height variation rate ΔH (ΔP/ΔH) is larger than a threshold Rgc which is determined based on the vehicle height H and the pressure P (Rgc<ΔP/ΔH). The GC determination condition 5(3) is that a drive command for the air compressor 6 is in an ON state (in an output state). The GC determination condition 6(3) is that the current command Ipv (current value) for the intake and exhaust valves 15 is larger than a predetermined drive current value Ipv0 (Ipv0=0.2 A, for example) (Ipv>Ipv0).

In this embodiment, the memory section 41A of the controller 41 stores maps of the thresholds Rsb, Rgc. Accordingly, the controller 41 calculates the thresholds Rsb, Rgc based on a current vehicle height H and a current pressure P. At this point of operation, the thresholds Rsb, Rgc may be the same value, or may be different values. The thresholds Rsb, Rgc may be successively set based on the vehicle height variation amount ΔH and the pressure variation amount ΔP which are actually measured. In this case, accuracy in SB determination and GC determination can be enhanced.

In step 9 in FIG. 3, the controller 41 determines whether or not all SB determination conditions 1(3) to 6(3) are established over a specific time. When it is determined "YES" in step 9, the processing proceeds to step 10. In step 10, in addition to stopping the vehicle height adjustment, the controller 41 sets the target vehicle height Ht to a value obtained by adding an impact avoidance amount dh (dh=10 mm, for example) to the current vehicle height H (Ht=H+dh).

On the other hand, when it is determined "NO" in step 9, the processing proceeds to step 11. In step 11, the controller 41 determines whether or not all GC determination conditions 1(3) to 6(3) are established over a specific time. When it is determined "YES" in step 11, the processing proceeds to step 12. In step 12, in addition to stopping the vehicle height adjustment, the controller 41 sets the target vehicle height Ht to a value obtained by subtracting the impact avoidance amount dh from the current vehicle height H (Ht=H−dh). When it is determined "NO" in step 11, the controller 41 maintains the target vehicle height Ht at the current value.

Thus, also in the third embodiment, generally the same operation and advantageous effects as the first embodiment can be acquired. In the third embodiment, the controller 41 determines a restriction of the upward or downward movement of the vehicle body 1 based on a value obtained by dividing the pressure variation rate ΔP of the detected value (pressure P) detected by the pressure sensor 17 by the vehicle height variation rate ΔH of the detected value (vehicle height H) detected by the vehicle height sensor 16. Accordingly, the determination does not depend on performance of the air compressor 6, for example, and hence, robustness of the vehicle height adjustment device can be enhanced.

In the third embodiment, the SB determination condition 5(3) is that the current command Ipv for the intake and exhaust valves 15 is larger than a predetermined drive current value Ipv0 (Ipv>Ipv0). However, the present invention is not limited to such a condition. For example, in place of the SB determination condition 5(3), a continuation of a state, where the current command Ipv for the intake and exhaust valves 15 is larger than the drive current value Ipv0 (Ipv>Ipv0), over a predetermined time may be set as one of the SB determination conditions. In this condition, the predetermined time is set to a value (10 seconds, for example) obtained by adding a margin (3 seconds, for example) to a maximum time (7 seconds, for example) during which the vehicle height of an actual vehicle does not vary. The reason for this is that the case is taken into account where an actual vehicle height may not vary after starting the vehicle height adjustment due to prying or hysteresis characteristics of the air suspension 3. Also in the case where a vehicle height H does not temporarily vary due to a reason other than an impact with an obstacle as described above, by adding a condition of continuation of a predetermined time, erroneous determinations can be suppressed.

In this case, in step 9 in FIG. 3, it is determined whether or not all SB determination conditions are established over a specific time. At this point of operation, in a state where neither the snow bank nor the garage ceiling is determined, the specific time is set to a short time (2 seconds, for example). On the other hand, after the garage ceiling is determined in the previous detection, the specific time is set to a value (3 seconds, for example) obtained by subtracting a predetermined time which is an initial determination time (10 seconds, for example) from a time obtained by adding a margin (1 second, for example) to a maximum time (12 seconds, for example) from an impact with an obstacle to the detection. Such a SB determination is also applicable to the first and second embodiments.

In the third embodiment, the GC determination condition 5(3) is that the current command Ipv for the intake and exhaust valves 15 is larger than a predetermined drive current value Ipv0 (Ipv>Ipv0). However, the present invention is not limited to the above. For example, in place of the GC determination condition 5(3), a continuation of a state, where the current command Ipv for the intake and exhaust valves 15 is larger than a drive current value Ipv0 (Ipv>Ipv0), over a predetermined time may be set as one of the SB determination conditions. In this condition, the predetermined time is set to a value (10 seconds, for example) obtained by adding a margin (3 seconds, for example) to a maximum time (7 seconds, for example) during which the vehicle height of an actual vehicle does not vary.

In this case, in step 11 in FIG. 3, it is determined whether or not all GC determination conditions are established over a specific time. At this point of operation, in a state where neither the snow bank nor the garage ceiling is determined, the specific time is set to a short time (2 seconds, for example). On the other hand, after the snow bank is determined in the previous detection, the specific time is set to a time (3 seconds, for example) for which a predetermined time which is an initial determination time is taken into account in the same manner as the SG determination condition. Such a GC determination is also applicable to the first and second embodiments.

In the third embodiment, the impact determination prohibition conditions may additionally include detection of the garage ceiling after the snow bank is detected, and detection of the snow bank after the garage ceiling is detected. The reason for this is to prevent a state where the snow bank and the garage ceiling are repeatedly determined. Such prohibition of impact determination is also applicable to the first and second embodiments.

In the above-mentioned respective embodiments, steps 6, 7 in FIG. 3 show specific examples of an impact determination prohibition means, and steps 8, 9, 11 show specific examples of an impact determination means. Further, in the above-mentioned respective embodiments, a determination of an impact with an obstacle and control of the air suspensions 3 are performed by the same controller 26, 31, 41. However, the present invention is not limited to such a configuration. The determination of an impact with an obstacle and control of air suspensions may be performed by separate controllers. That is, the controller 26, 31, 41 may control the air suspensions 3 based on determination results obtained by the separate controllers.

In the above-mentioned respective embodiments, the air suspensions 3 are provided to the rear wheels 2C, 2D. However, the present invention is not limited to such a configuration. An air suspension may be provided to all wheels 2A to 2D, or an air suspension may be provided to only the front wheels.

In the above-mentioned respective embodiments, the description have been made by taking a pneumatic suspension device, which includes the air compressor module 5 and the air suspensions 3 serving as the fluid pressure device, as an example. However, the present invention is not limited to such a configuration. For example, the present invention is also applicable to a suspension device of an oil pressure type which includes an oil pressure pump, and an oil pressure damper and a hydraulic cylinder serving as a fluid pressure device.

The present invention is also applicable to an electromagnetic suspension capable of adjusting a vehicle height by a magnetic force. In this case, an electric current to be supplied to the electromagnetic suspension may be detected as a physical quantity relating to a restriction of upward or downward movement of the vehicle body, for example. That is, the detection device may be formed of a current sensor which detects an electric current to be supplied to the electromagnetic suspension.

In the above-mentioned respective embodiments, the description has been made by taking a case where the air suspension device is applied to a vehicle of a four-wheeled vehicle as an example. However, the present invention is not limited to such a configuration. For example, the present invention is also applicable to another vehicle such as a railway vehicle.

Next, various aspects which are included in the above-mentioned embodiments are described. The vehicle height adjustment device includes: the vehicle height adjustment actuators which are provided to at least the pair of front wheels or the pair of rear wheels out of the plurality of wheels of the vehicle, and which are configured to adjust a vehicle height defined by a distance between the wheels and the vehicle body; the actuator control device configured to control the vehicle height adjustment actuators such that the vehicle height approximates to a target vehicle height; and the detection device configured to detect physical quantities which vary as upward or downward movement of the vehicle body is restricted due to contact with an external contacted object. The actuator control device stops the upward or downward movement of the vehicle body, and switches to movement in an opposite direction, based on a detected value of the detection device, when the determination that the movement of the vehicle body is restricted is made by the detection device.

With such a configuration, even when an obstacle, which is a contacted object, is disposed at either a position above the vehicle body or a position below the vehicle body, an impact between the vehicle body and the object can be detected with high accuracy. In addition to the above, when the movement of the vehicle body is restricted, the vehicle body is moved in a direction opposite to the moving direction in the vehicle height adjustment. Accordingly, the vehicle body is separated from the obstacle, thus suppressing a damage of the vehicle and, the vehicle can be brought into a moveable state.

Each of the vehicle height adjustment actuators is a fluid pressure device which adjusts the vehicle height by a fluid pressure. The detection device includes a vehicle height detection device, and a pressure detection device which detects a fluid pressure acting on the fluid pressure device. The actuator control device determines whether or not the upward or downward movement of the vehicle body is restricted, based on a pressure variation rate, which is calculated from detected values detected by the pressure detection device, and a vehicle height variation rate, which is calculated from detected values detected by the vehicle height detection device. With such a configuration, the relationship between the vehicle height variation rate and the pressure variation rate varies depending on whether or not the vehicle body impacts with the obstacle. Accordingly, an impact between the vehicle body and an obstacle can be detected based on the relationship between the vehicle height variation rate and the pressure variation rate.

The actuator control device determines whether or not the upward or downward movement of the vehicle body is restricted using a threshold for the pressure variation rate, which is calculated based on a detected value detected by the pressure detection device and a detected value detected by the vehicle height detection device, and a threshold for the vehicle height variation rate, which is calculated based on a detected value detected by the pressure detection device and a detected value detected by the vehicle height detection device. Accordingly, characteristics and the like of the fluid pressure device can be taken into account.

The actuator control device determines whether or not the upward or downward movement of the vehicle body is restricted using a threshold for the pressure variation rate, which is calculated from the pressure variation rate obtained by a past detection, and a threshold for the vehicle height variation rate, which is calculated from the vehicle height variation rate obtained by a past detection. With such a configuration, the pressure variation rate and the vehicle height variation rate vary based on various conditions such as a pressure and a vehicle height. However, the thresholds for the pressure variation rate and the vehicle height variation rate are calculated from a past detection value and hence, it becomes unnecessary to take into account various conditions.

Each of the vehicle height adjustment actuators is a fluid pressure device which adjusts the vehicle height by a fluid pressure. The detection device includes a vehicle height detection device, and a pressure detection device which detects a fluid pressure acting on the fluid pressure device. The actuator control device determines whether or not the upward or downward movement of the vehicle body is restricted, based on a value obtained by dividing a pressure variation rate, which is calculated from detected values detected by the pressure detection device, by a vehicle height variation rate, which is calculated from detected values detected by the vehicle height detection device. With such a configuration, the determination does not depend on performance of a fluid pressure supply source, for example, and hence, robustness of the vehicle height adjustment device can be enhanced.

A determination threshold for the value, obtained by dividing the pressure variation rate by the vehicle height variation rate, is successively set based on a vehicle height variation amount and a pressure variation amount which are actually measured. With such a configuration, determination accuracy of contact with an obstacle can be enhanced.

The embodiments of the present invention have been described heretofore. However, the above-mentioned embodiments of the invention are provided for facilitating the understanding of the present invention, and are not intended to limit the present invention. Various modifications and variations of the present invention are conceivable without departing from the spirit of the present invention, and the present invention includes a technique equivalent to the present invention. Within a range where at least a portion of the above-mentioned problem can be solved or within a range where at least a portion of the above-mentioned advantageous effects can be acquired, respective constitutional elements described in the claims and the specification may be arbitrarily combined or omitted.

This application claims priority to Japanese patent application No. 2016-065467 filed on Mar. 29, 2016. The entire disclosure including the specification, the claims, the drawings, and the abstract of Japanese patent application No. 2016-065467 filed on Mar. 29, 2016 is incorporated herein by reference.

REFERENCE SIGNS LIST

1: vehicle body, 2A to 2D: wheel, 3: air suspension (fluid pressure device), 5: air compressor module, 12: exhaust valve, 15: intake and exhaust valve, 16: vehicle height sensor (vehicle height detection device), 17: pressure sensor (pressure detection device), 21: battery, 26, 31, 41: controller (actuator control device)

The invention claimed is:

1. A vehicle height adjustment device comprising:
vehicle height adjustment actuators provided to at least a pair of front wheels or a pair of rear wheels out of a plurality of wheels of a vehicle, and configured to adjust a vehicle height defined by a distance between the wheels and a vehicle body;
an actuator control device configured to control the vehicle height adjustment actuators such that the vehicle height approximates to a target vehicle height; and
a detection device configured to detect a physical quantity which varies as upward or downward movement of the vehicle body is restricted due to contact with an external contacted object, wherein
the actuator control device is configured to stop the upward or downward movement of the vehicle body, and switch to movement in an opposite direction based on a detected value of the detection device, when the determination that the movement of the vehicle body is restricted is made by the detection device,
each of the vehicle height adjustment actuators is a fluid pressure device configured to adjust the vehicle height by a fluid pressure,
the detection device includes a vehicle height detection device, and a pressure detection device configured to detect a fluid pressure acting on the fluid pressure device,
the actuator control device is configured to determine whether or not the upward or downward movement of the vehicle body is restricted, based on a pressure variation rate, which is acquired from detected values detected by the pressure detection device, and a vehicle height variation rate, which is acquired from detected values detected by the vehicle height detection device,
the detection device includes a vehicle height detection device, and a pressure detection device, and
the actuator control device is configured to determine whether or not the upward or downward movement of the vehicle body is restricted, based on a value obtained by dividing the pressure variation rate by the vehicle height variation rate.

2. The vehicle height adjustment device according to claim 1, wherein
the actuator control device is configured to determine whether or not the upward or downward movement of the vehicle body is restricted using a threshold for the pressure variation rate, which is acquired based on a detected value detected by the pressure detection device and a detected value detected by the vehicle height detection device, and a threshold for the vehicle height variation rate, which is acquired based on a detected value detected by the pressure detection device and a detected value detected by the vehicle height detection device.

3. The vehicle height adjustment device according to claim 1, wherein
the actuator control device is configured to determine whether or not the upward or downward movement of the vehicle body is restricted using a threshold for the pressure variation rate, which is acquired from the pressure variation rate obtained by a past detection, and a threshold for the vehicle height variation rate, which is acquired from the vehicle height variation rate obtained by a past detection.

4. The vehicle height adjustment device according to claim 1, wherein
the vehicle height adjustment device is configured to successively set a determination threshold for the value obtained by dividing the pressure variation rate by the vehicle height variation rate, based on a vehicle height variation amount and a pressure variation amount which are actually measured.

* * * * *